Patented June 1, 1943

2,320,342

UNITED STATES PATENT OFFICE 2,320,342

TREATING FERROPHOSPHORUS

Grover L. Bridger, near Sheffield, Ala.

No Drawing. Application March 17, 1942,
Serial No. 435,073

7 Claims. (Cl. 75—28)

(Granted under the act of March 3, 1883, as
amended April 30, 1928; 370 O. G. 757)

The invention herein described may be manufactured and used by or for the Government for governmental purposes without the payment to me of any royalty thereon.

This invention relates to the art of treating ferrophosphorus, a by-product from the reduction of phosphatic material, to produce more valuable products therefrom.

The principal object of this invention is to provide a method for rapid and substantially complete oxidation of the constituents of ferrophosphorus. Another object of this invention is to provide a method for readily converting the phosphorus content of ferrophosphorus into material which is available as a plant food. A further object of this invention is to provide a method for the removal of silicon from ferrophosphorus in order that material not otherwise suitable may be made available for metallurgical uses. Other objects of this invention include the provision for a method of treating ferrophosphorus whereby the phosphorus is converted into more useful material, but the iron therein may be recovered with a satisfactory degree of purity for metallurgical purposes.

Ferrophosphorus can be converted into oxides of iron and phosphorus by heating in the presence of oxygen. Most commercial grades of ferrophosphorus contain some silicon and other minor impurities which also can be oxidized by the same treatment. It has been hitherto proposed that ferrophosphorus alone may be oxidized at relatively high temperatures. This reaction is highly exothermic, but when initiated at temperatures such as to obtain a practical reaction rate, the heat generated is sufficient to fuse the ferrophosphorus and thereby makes it difficult to carry out the treatment in many types of apparatus because of the fusion of the material which results in incomplete oxidation and mechanical difficulties in operating the apparatus. In particular, undiluted ferrophosphorus cannot be oxidized to a high degree in a rotary kiln because of ring formation resulting from the fusion of ferrophosphorus.

According to the present invention, finely divided ferrophosphorus is mixed with finely divided limestone, and the mixture is maintained in an oxidizing atmosphere at an elevated temperature, but at a temperature below the fusion point of either of the constituents of the charge or the fusion point of any of the intermediate or final products resulting from such heat treatment. During this treatment, the respective constituents of the ferrophosphorus are oxidized, and the limestone is converted to calcium oxide. Depending upon the proportions of limestone used, the fineness of the constituents of the mixture, and the length of time the mixture is treated in the oxidizing atmosphere, the silicon content of the ferrophosphorus alone may be oxidized, the silicon and phosphorus content may be oxidized, or all of the constituents of the ferrophosphorus may be oxidized with the resulting production of a material which may contain a calcium silicate or a calcium phosphate or a mixture of calcium silicate and calcium phosphate.

One example is given for the oxidation of ferrophosphorus to produce calcium phosphate fertilizer according to the present invention. 100 parts by weight of ferrophosphorus containing 67.0% Fe, 19.7% P, and 8.4% Si, and ground so that all passed through a 40-mesh screen, and approximately 60% passed through a 100-mesh screen, were thoroughly mixed with 180 parts by weight of limestone containing 48.6% CaO (with 44.9% ignition loss) and ground so that all passed through a 20-mesh screen and approximately 50% passed through a 100-mesh screen. The mixture was fed continuously to a rotary kiln which was heated to 1000–1200° C. in the hottest zone by combustion of by-product carbon monoxide gas from phosphate reduction furnaces. An excess of oxygen was maintained in the kiln by using air in substantially excess of that required for combustion of the gas. The time required for the material to pass through the kiln was about 40 minutes. The product resulting therefrom was a granular, nodulized material containing 19.7% total $P_2O_5$ (12.4% soluble in a citrated ammonium nitrate solution), 30.2% CaO, 8.2% $SiO_2$, and 40% $Fe_2O_3$. From the composition of the product it was calculated that the degree of oxidation of the ferrophosphorus was 89.0%. Plant growth tests of the product indicated that the solubility of the $P_2O_5$ was a satisfactory measure of its availability to plants.

A second example is given for the oxidation of ferrophosphorus to produce a calcium phosphate fertilizer and metallurgical iron according to the present invention. Ferrophosphorus and limestone of the same compositions and degrees of fineness as in the first example were mixed in the same proportions as in the first example. The mixture was heated in a rotary kiln as in the first example, except that the degree of oxidation of the ferrophosphorus was limited so that only a 15% excess of the amount of oxygen stoichiometrically required to oxidize the phosphorus to $P_2O_5$, the silicon to $SiO_2$, and the manganese to MnO, was gained by the mixture. The product from the rotary kiln was melted in an electric furnace. Upon melting, the material separated into a slag phase and a metal phase. These molten materials were poured from the furnace and allowed to solidify. The slag contained 22.9% $P_2O_5$, of which 94% was soluble in citrated ammonium nitrate solution and 94% was soluble in neutral ammonium citrate solution. Plant growth tests substantiated these solubility tests as a measure of the availability of the $P_2O_5$ in this product. The metal was substantially pure iron, containing 0.02% phosphorus, 0.01% silicon, and 0.01% manganese.

Ferrophosphorus, as produced in phosphate reduction furnaces operated primarily for the production of elemental phosphorus, generally contains up to 15% of silicon. Such high silicon ferrophosphorus is generally unsuitable for metallurgical uses where high-grade ferrophosphorus is required. This high silicon ferrophosphorus is the type of raw material for which this invention is particularly useful, although, of course, it may be operated, using low silicon ferrophosphorus. In any event, the ferrophosphorus is ground to obtain a relatively fine state of subdivision, although the reduction to impalpable powder is not absolutely essential.

The limestone used in the process is likewise ground until it is subdivided to a fineness of the same general order as that of the ferrophosphorus. The term "limestone" as used herein includes any calcium carbonate containing material.

The proportions in which the fine ferrophosphorus and the fine limestone are admixed depend upon the type of product which it is desired to produce. For example, when the primary object is to convert the phosphorus content of the ferrophosphorus to plant food, approximately 180 parts of limestone are used per 100 parts of ferrophosphorus. Also, when it is desired to recover substantially all of the iron in the ferrophosphorus as a relatively high-grade iron, only substantially that amount of lime which corresponds to the production of $4CaO.P_2O_5$ and $2CaO.SiO_2$ from the phosphorus and silicon, respectively, in the ferrophosphorus is used. Likewise, when it is desired only to remove the silicon from the ferrophosphorus, only substantially that amount of limestone required to form $2CaO.SiO_2$ from the silicon is supplied.

The temperature employed is of the order of 1000 to 1200° C., with the lower limit being that temperature at which the limestone may be converted at a reasonably rapid rate to calcium oxide, and the upper limit being such that neither the mixture nor any of the constituents thereof or intermediate or final products of the oxidation steps in the process are fused or melted. Some slight sintering may be effected, however, without producing a fused or molten condition.

It is preferable to operate the process of the present invention continuously by feeding a stream of the mixture of materials employed into an internally heated rotary kiln which is supplied with an atmosphere containing free oxygen in a stream countercurrent to the charge of solid material fed to the kiln. It is important that the gaseous atmosphere discharged from the kiln contain free oxygen. However, the amount of oxidation obtained will depend primarily upon the purpose for which the process is operated. When the ferrophosphorus is being treated to produce calcium phosphate fertilizer, all of the phosphorus and silicon is oxidized and a part or all of the iron therein may be oxidized. When the ferrophosphorus is being treated to produce iron therefrom, the constituents of the ferrophosphorus are oxidized only in slight excess, say 15%, of that degree of oxidation required for the oxidation of the phosphorus to $P_2O_5$, the silicon to $SiO_2$, and the manganese to MnO. When the purpose of the treatment of the ferrophosphorus is solely to remove silicon, the oxidation of the ferrophosphorus is limited to the use of a slight excess of oxygen over that required for the oxidation of the silicon alone in the ferrophosphorus used.

It will be seen from the foregoing that the process of the present invention is adaptable to the substantially complete oxidation of ferrophosphorus in a rotary kiln, whereas this could not be accomplished by any previously known process. Also, the product obtained from the oxidation of the phophorus in the ferrophosphorus is suitable for use a phosphatic plant food and has special value as a fertilizer for soils which are either acidic or deficient in iron. Furtheremore, the process of the present invention not only affords a method for the removal of silicon from high silicon ferrophosphorus in order that it may be suitable for metallurgical purposes, but also affords a method for the recovery of iron as a metal useful for such purposes.

It will be seen, therefore, that this invention actually may be carried out by the use of various modifications and changes without departing from its spirit and scope.

I claim:

1. A process of treating ferrophosphorus which comprises (a) preparing a charge by mixing fine ferrophosphorus and fine limestone, (b) delivering said charge to a heating zone maintained at temperatures above the initial temperature for conversion of limestone to calcium oxide and below the fusion point of the mixture and the treated material produced therefrom, and (c) maintaining the mixture in said heating zone in intimate contact with a free oxygen-containing atmosphere.

2. A process of treating ferrophosphorus which comprises (a) preparing a charge by mixing fine ferrophosphorus and fine limestone, (b) delivering a stream of said charge to a heating zone maintained at temperatures above the initial temperature for conversion of limestone to calcium oxide and below the fusion point of the mixture and the treated material produced therefrom, (c) admitting an oxygen-containing atmosphere to a boundary of said heating zone spaced from the locus of supply of said charge thereto with the quality and amount of said atmosphere so regulated as to maintain free oxygen in the atmosphere adjacent to said locus of supply of the charge, and (d) withdrawing treated material from said heating zone adjacent to the locus of supply of said atmosphere to said zone.

3. A process of treating ferrophosphorous to produce a phosphatic plant food therefrom which comprises (a) preparing a charge by mixing fine ferrophosphorus and fine limestone in amount at least sufficient to supply CaO in the ratio of $4CaO : P_2O_5$ to the phosphorus in said ferrophoszone maintained at temperatures below the fusion point of the mixture and the treated material produced therefrom, (c) maintaining the mixture in said heating zone in intimate contact with a free oxygen-containing atmosphere for a time sufficient to obtain substantially both complete oxidation of the phosphorus in the ferrophosphorus and removal of carbon dioxide from the limestone, and (d) withdrawing the resulting unfused material from said heating zone.

4. A process of treating ferrophosphorus to produce a phosphatic plant food therefrom which comprises (a) preparing a charge by mixing fine ferrophosphorus and fine limestone in amount at least sufficient to supply CaO in the ratio of $4CaO : P_2O_5$ to the phosphorus in said ferrophosphorus, (b) delivering said charge to a heating zone maintained at a temperature between 1000 and 1200° C., (c) maintaining the mixture in said heating zone in intimate contact with a free oxygen-containing atmosphere for a time sufficient to obtain substantially both complete oxidation of the phosphorus in the ferrophosphorus and removal of carbon dioxide from the limestone, and (d) withdrawing the resulting unfused material from said heating zone.

5. A process of treating ferrophosphorus to produce a phosphatic plant food and iron therefrom which comprises (a) preparing a charge by mixing fine ferrophosphorus of predetermined composition with an amount of fine limestone at least sufficient to supply the CaO required to form $4CaO . P_2O_5$ and $2CaO . SiO_2$ respectively from the phosphorus and silicon contained in said ferrophosphorus, (b) delivering said charge to a heating zone maintained at temperatures below the fusion point of the mixture and the treated material produced therefrom, (c) maintaining the mixture in said heating zone in intimate contact with a free oxygen-containing atmosphere for a time sufficient that the amount of oxygen absorbed during the oxidation of the ferrophosphorus is only slightly in excess of that required to oxidize the nonferrous constituents, P to $P_2O_5$, Si to $SiO_2$ and Mn to MnO, (d) withdrawing the resulting unfused material from said heating zone, (e) fusing said treated material, and (f) separating the molten iron and phosphatic plant food.

6. A process of treating ferrophosphorus to produce a phosphatic plant food therefrom which comprises (a) preparing a charge by mixing fine ferrophosphorus and fine limestone in amount at least sufficient to supply CaO in the ratio of $4CaO : P_2O_5$ to the phosphorus in said ferrophosphorus, (b) delivering said charge to a heating zone maintained at temperatures above the initial temperature for conversion of limestone to calcium oxide and below the fusion point of the mixture and the treated material produced therefrom, (c) maintaining the mixture in said heating zone in intimate contact with a free oxygen-containing atmosphere for a time sufficient to obtain substantially both complete oxidation of the ferrophosphorus and removal of carbon dioxide from the limestone, and (d) withdrawing the resulting unfused material from said heating zone.

7. A process of treating ferrophosphorus to produce a phosphatic plant food therefrom which comprises (a) preparing a charge by mixing fine ferrophosphorus and fine limestone in amount at least sufficient to supply CaO in the ratio of $4CaO : P_2O_5$ to the phosphorus in said ferrophosphorus, (b) delivering said charge to a heating zone maintained at a temperature between 1000 to 1200° C., (c) maintaining the mixture in said heating zone in intimate contact with a free oxygen-containing atmosphere for a time sufficient to obtain substantially both complete oxidation of the ferrophosphorus and removal of carbon dioxide from the limestone, and (d) withdrawing the resulting unfused material from said heating zone.

GROVER L. BRIDGER